June 27, 1939.   G. D. SCHWEIGERT   2,164,259
FISHHOOK FILE OR CARRIER
Filed Nov. 18, 1937
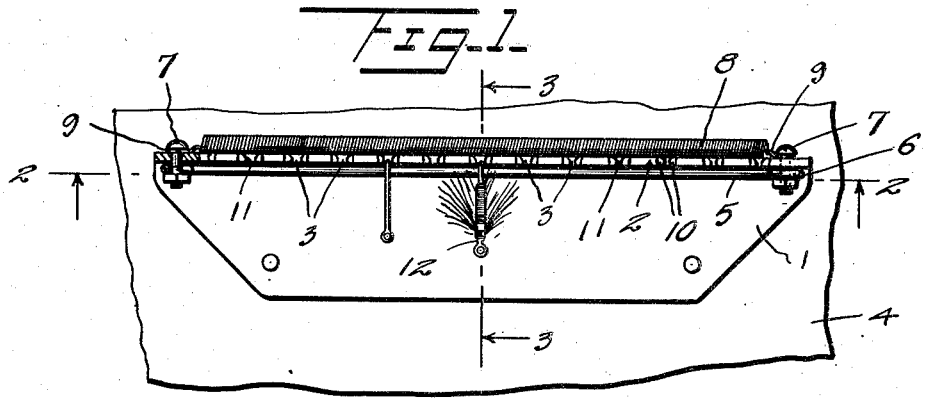
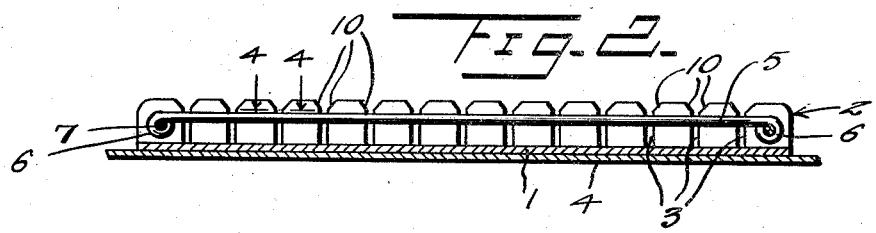
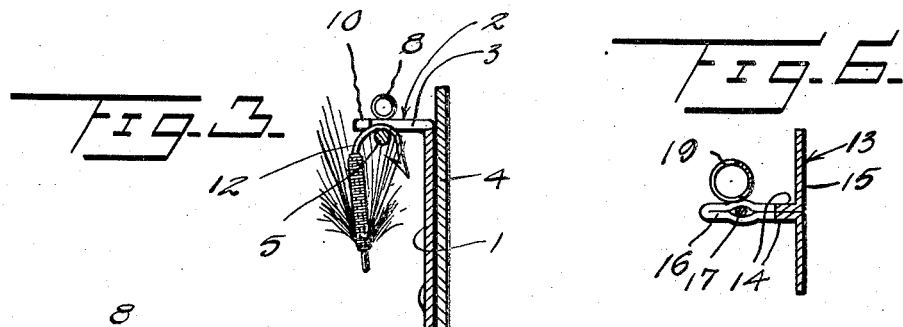
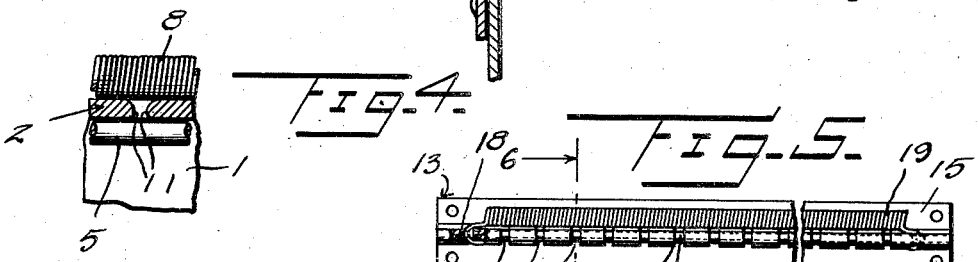
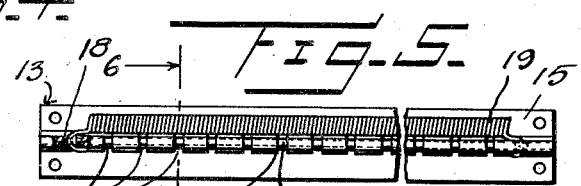
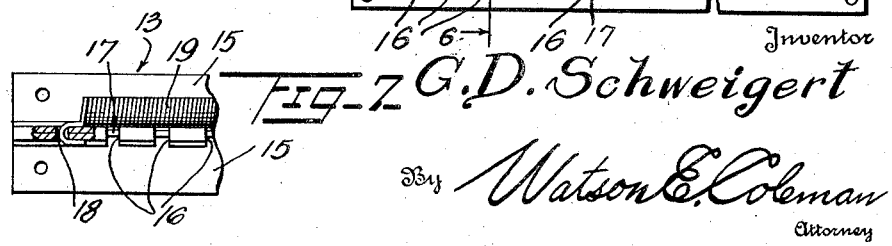
Inventor
G. D. Schweigert
By Watson E. Coleman
Attorney Patented June 27, 1939

2,164,259

UNITED STATES PATENT OFFICE 2,164,259

FISHHOOK FILE OR CARRIER

George D. Schweigert, Denver, Colo.

Application November 18, 1937, Serial No. 175,326

8 Claims. (Cl. 43—32)

This invention relates to the class of fishing and pertains particularly to improvements in fishermen's accessories.

The present invention has for its primary object to provide an improved carrier or file for fishhooks, wherein hooks may be conveniently retained in a fixed position in such a manner that they cannot become accidentally loosened and lost but may at the same time be conveniently accessible for ready removal from the carrier or file when desired for use by the fisherman.

Another object of the invention is to provide a fishhook carrier or filing unit which is adapted to be secured within a fly box or book or upon the inner wall of a tackle box, and which will support hooks as such or flies in such a manner that they will not be bound so as to have the points thereof or the points of the barbs dulled by contact with any adjacent object.

A still further object of the invention is to provide a filing means for flies or other types of hooks, in which the hooks are all suspended in side-by-side relation and are so held that any one may be easily removed from the row by shifting or swinging the hooks upon either side of the selected one so that the fingers may be easily inserted to grasp the selected hook and remove it from its support.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:

Figure 1 is a view in front elevation of the hook filing unit embodying the present invention, the same being shown applied to a supporting body and having a fly and a bare hook mounted thereon.

Fig. 2 is a sectional view taken on the line 2—2 of Fig. 1.

Fig. 3 is a sectional view taken on the line 3—3 of Fig. 1.

Fig. 4 is a sectional view taken on the line 4—4 of Fig. 2.

Fig. 5 is a view in elevation of a modified form of the invention.

Fig. 6 is a section taken on the line 6—6 of Fig. 5.

Fig. 7 is a detailed view on an enlarged scale of the sectioned end of the structure shown in Fig. 5.

Referring now more particularly to the drawing, the numeral 1 designates a plate of suitable material such as aluminum, a portion of which is bent to project at right angles forming the edge flange 2 into which are cut or otherwise formed from the front edge thereof a series of spaced parallel slots 3 which extend the full width of the flange, as is clearly shown in Figs. 2 and 3. This plate 1 which forms the body of the device may be made in any suitable size so that it may be secured within a fly book or box or when made in a larger size may be used in a tackle box or in any other suitable location for supporting large hooks, plugs, or similar hook carrying lures. The plate is here illustrated as being secured to a supporting body 4 and the flange 2 extends forwardly from this edge so that the hooks supported in the manner hereinafter described will hang free and be easily accessible.

Secured longitudinally of the underside of the flange 2 is a bar 5, each end of which has an eye 6 thru which passes the shank of a bolt 7 which also passes thru the adjacent end of the flange so that the portion of the bar lying between the eyes will be disposed in close proximity to the underside of the flange to extend across the slots 3 in spaced relation with the body plate 1. Fig. 2 shows the bar as extending across the slots adjacent the forward open ends thereof, but it will of course be understood that the bar may be placed in any position between the plate 1 and the forward edge of the flange which is found to be best for the efficient operation of the device.

Disposed longitudinally of the flange 2 across the top thereof and directly over and parallel with the bar 5 is the elongated resilient body 8 which is here illustrated as being in the form of a coil spring. This spring lies upon the top of the flange and is secured at its ends by the bolts 7 which pass through the eyes 9 which are formed at the ends of the spring. This spring is preferably of very simple light construction and has the convolutions lying close together or in contacting relation so that when inserting a hook into a slot 3 for engagement over the bar 5 or when removing a hook, it will not slip in between the convolutions of the spring, but the convolutions will aid in guiding the hook into position. By bringing the convolutions of the spring into contact with one another the application of a hook to the carrier is faciltated for altho the hook may cause two convolutions to separate slightly it will not open them up to a sufficient extent to become entangled and thus defeat the purpose of the invention.

It is to be understood that altho a coil spring has been illustrated and described as extending across the top of the flange 2 to maintain the hooks in position upon the bar 5, any other suitable resilient holding means in the nature of an elongated body or strand may be made use of such as a rubber band, altho the metal spring is preferred because of its long life and the fact that it will not change in any manner which would alter the efficient operation of the carrier.

As illustrated in Fig. 2, the edges of the slots 3 at the outer ends thereof are cut off at an angle so that the outer end of each slot will be materially widened, as indicated at 10, and it is also preferred that the edges of the material at each side of the slot be rounded slightly as indicated at 11 in Fig. 4 with the slot of greater width at the top than at the underside of the flange 2. With this arrangement there is less possibility of the fisherman accidentally striking the flange at one side of a slot when attempting to insert a hook.

Fig. 3 illustrates particularly the position assumed by a hook when in place upon the hook file or carrier. The hook is indicated by the numeral 12 and as is shown, it is supported entirely by the bar 5 while extending into the slot 3 and is prevented from upward movement by the overlying spring 8. The bar 5 is so disposed with relation to the plate 1 that the point of the hook will not be pressed against the plate so as to be dulled thereby, and it will also be seen that the barb is effectively held against contact with the bar 5 and therefore will not become damaged no matter how much the carrier may be thrown about.

From the foregoing it will be readily apparent that a device embodying the present invention will efficiently support a large number of hooks in such a manner that any one thereof may be easily removed for use by merely taking a hold upon the shank portion and lifting it from the bar so as to force the rounded part against the underside of the spring 8 whereupon the latter will slide to one side and permit the hook to be taken off the bar. This operation may be facilitated by pressing the retaining spring 8 back slightly toward the supporting body 4 so that the barb of the hook will not be accidentally caught against the bar 5. In placing the hook upon the support, the outer side of the point is pressed against the side of the spring retainer and pushed back by the hook while at the same time shifting the hook downwardly through a slot 3 so as to engage it over the supporting bar, whereupon the holding spring 8 will return naturally to its proper position. While the device has been illustrated as supporting artificial flies and bare hooks of the same size, it will be readily understood that by increasing the size of the device it may be employed for supporting large hooks or artificial bait of the nature of plugs and spinners, and the device may also be employed as a wall support for hooks of the largest size used in deep sea fishing.

In Figs. 5 and 6, there is shown a slightly modified form of the invention, wherein the body portion of the hook file comprises a plate, indicated as a whole by the numeral 13 and formed by bending the plate longitudinally thru its center so as to provide the double-thick portions 14 each terminating in a lateral portion 15. The lateral portions are provided for securing the device to a supporting body such as the body of a fly book or the wall of a tackle box. The two portions 14 which extend longitudinally of the file are provided with the slots 16 corresponding to the slots 3 of the previously described form of the invention, and there is disposed between these portions 14 the thin wire or bar 17 which extends longitudinally of the holder and is disposed transversely of the slots 16 as shown in Fig. 6. The two parts 14 of the device are pressed firmly together so that the wire 17 will be tightly gripped therebetween and thus held against movement.

The parts 14 together form a slotted plate, perpendicularly to the edge alined portion 15, which is provided at each end with an aperture 18 and extending longitudinally of one side of this plate is a coiled spring 19 which has each of its ends engaged in the aperture 18 as shown in Fig. 5. With this construction it will be readily apparent that the manner of mounting the hooks on the support or file is the same as described in connection with the structure shown in Fig. 1, but with this modified form the wire of the bar 17 will be held against sagging in the event that it is used to support a large number of hooks and the hooks are left thereon for a considerable length of time.

What is claimed, is:

1. A fishhook file comprising a body provided with a slot which is adapted to receive the pointed portion of a fishhook, a body disposed transversely of the slot upon one side of said first body over which the hook is engaged, and resilient means disposed transversely of the opposite side of the slot and opposite said second body, for maintaining the hook in position in the slot.

2. A fishhook file comprising a plate provided with a series of slots opening thru one edge thereof, a bar member disposed transversely of one side of the plate and across said slots, and a resilient body disposed in parallel relation with said bar upon the opposite side of the plate and overlying the slots to retain a fishhook in position therein.

3. A fishhook file comprising a plate member having a laterally directed flange, said flange being provided with a series of transverse slots extending inwardly from the free long edge thereof and adapted to have the pointed end of a fishhook inserted thereinto, a fishhook supporting member extending longitudinally of the flange and disposed against one face thereof, said member being in close proximity to the plate, and an elongated longitudinally yieldable retaining member disposed longitudinally of the other side of the flange from said supporting member and disposed in the same plane and adapted to removably retain in position upon the supporting member fishhooks located in said slots.

4. A fishhook file comprising an elongated flat body, means for securing the body against a supporting surface whereby the body is disposed perpendicularly thereto, the edge of said body remote from said supporting surface having a series of slots cut thereinto to extend transversely of the body, a bar member extending throughout the length of said body along one face thereof and disposed across said slots, and a spring member extending throughout the length of said body upon the opposite face from said bar member and secured at its ends to the ends of the body whereby it will overlie said slots to retain in position therein fishhooks suspended from said bar.

5. A fishhook file comprising an elongated flat body provided with a series of slots opening thru one edge thereof, means for securing said body at the opposite edge to a support, hook supporting means extending longitudinally of the body and across said slots, and yieldable means for maintaining the hooks in hanging position upon the supporting means.

6. A fishhook file comprising an elongated body consisting of two plate members disposed one upon the other, flange means at one longitudinal edge of the body for attaching the same to a support, said body having a series of slots formed therein and opening thru the other longitudinal edge, a bar secured longitudinally of the body between the said plates and lying across the slots, and an elongated longitudinal yieldable member disposed longitudinally of the body across said slots and in parallel relation with said bar to yieldably maintain the fishhooks in the slots and on the bar.

7. A fishhook file, comprising an elongated body provided with a series of slots extending transversely from one side thereof and each adapted to receive the bill portion of a fishhook, means extending across each slot for supporting the fishhook therein, said means being designed to prevent accidental removal of the hook through application of a pull upon the hook against the supporting means and means coacting with the supporting means for maintaining the hook in position on the supporting means and in the slot.

8. A fishhook file, comprising a plate body, a plurality of members disposed in spaced edge opposed relation and carried by said plate, said members extending in one direction from the plate and the spaces between the members being designed each to receive the bill portion of a fishhook, means extending across the spaces between said members providing a support for the fishhook in each space, and means extending across the spaces between the members upon the opposite sides thereof from said supporting means, said last-named means being adapted to maintain the hooks in position in the spaces and being shiftable to facilitate insertion or removal of the hooks.

GEORGE D. SCHWEIGERT.